3,649,409
PROCESS FOR LINING A PLASTIC CYLINDER
WITH ANOTHER PLASTIC
George F. Bell, Newark, and Kit P. Carson, Wilmington,
Del., assignors to E. I. du Pont de Nemours and
Company, Wilmington, Del.
Filed July 1, 1969, Ser. No. 838,291
Int. Cl. B32b 31/20
U.S. Cl. 156—294     11 Claims

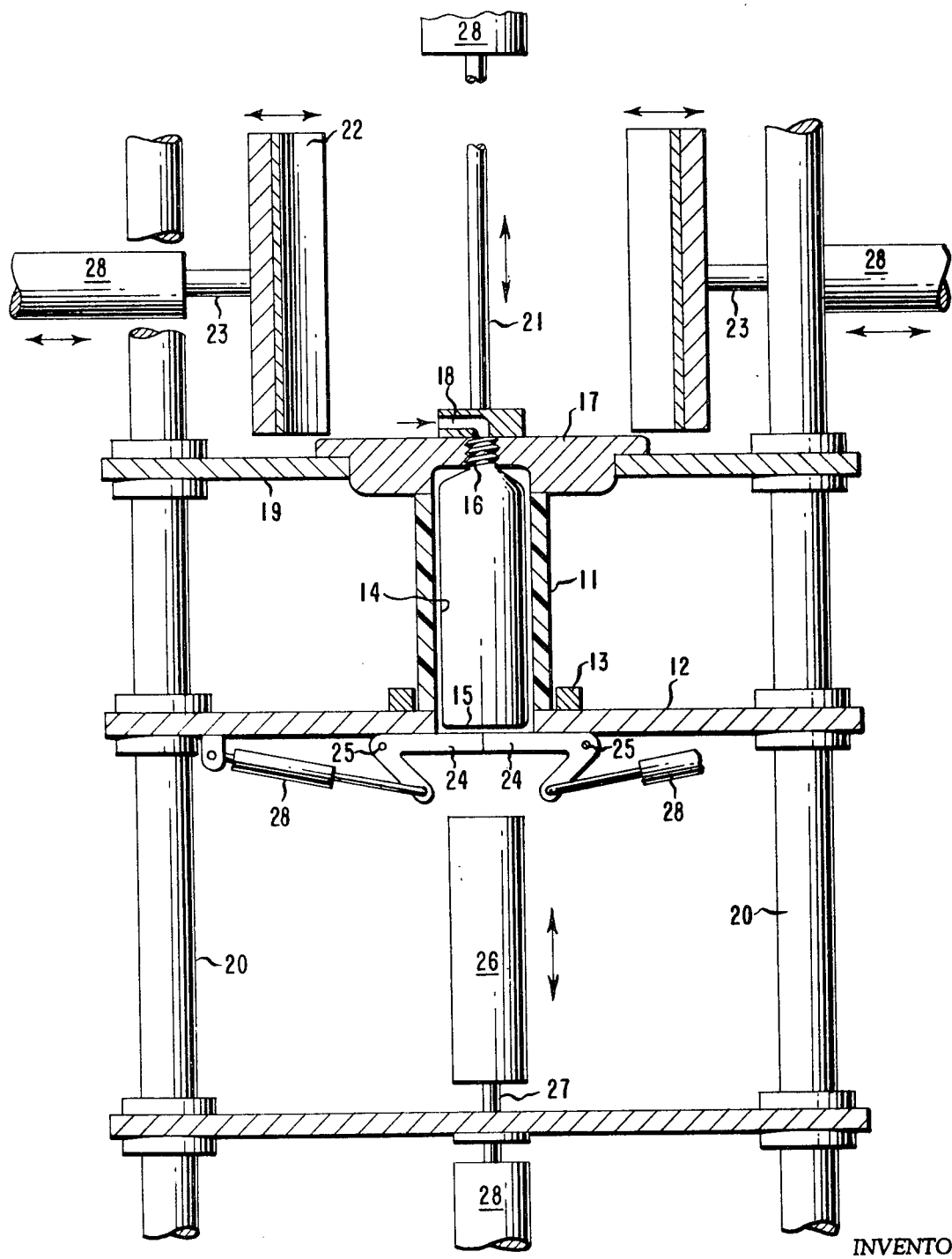

ABSTRACT OF THE DISCLOSURE

A process for lining a cylindrically shaped article made from a first plastic that softens before it degrades with a second plastic which also softens before it degrades, which comprises: preforming the second plastic into the form of a bottle, heating said bottle until soft, radiantly heating the internal surface of said article until soft with a radiant heater maintained at a temperature just sufficient to raise the internal surface of said article to the desired temperature without degrading that surface or destroying the dimensional stability of said article, positioning said bottle within said article, and inflating said bottle until it contacts the internal surface of said article and bonds to it.

BACKGROUND OF THE INVENTION

This invention relates to a process for lining the interior of cylindrically shaped articles. More particularly it relates to a process for lining a substantially cylindrical plastic article with another plastic. The process is particularly useful for lining a substantially cylindrical article made from tetrafluoroethylene with a copolymer of tetrafluoroethylene and hexafluoropropylene.

There are many instances where the plastic from which a cylindrically shaped article is formed has physical properties well suited for its external or gross characteristics, but unsuited for its internal surfaces. Such is the case when a plastic, chosen for its durability or rigidity is used to form a cylindrical article that must have an internal surface which is either chemically resistant, frictionless or easily bonded to another structure. In these cases it is common to line the internal surface of the article with another plastic having the desired characteristics.

The problems inherent in lining cylinders made from one material with another material are well known. It is difficult to achieve a continuous, defect-free lining, and it is difficult to achieve a lining that is tightly bonded to the lined article. Spray coating suffers from the above defects plus the fact that it is often difficult to find solvents or dispersing agents for the coating material. Blow lining, by inflating a preformed structure of the desired material until it conforms to the internal surface of the article, will usually produce a defect-free lining, but the bonding problem, especially between chemically different plastics or plastics that are characteristically difficult to bond, still remains.

It is an object of the present invention to provide an improved process for blow lining a substantially cylindrical article made from one plastic with another plastic. It is a further object of the present invention to provide a process for lining substantially cylindrical articles, made from a first plastic that softens before it degrades, with a linear of a second plastic, that also softens before it degrades and has a degradation temperature lower than the temperature to which the first plastic must be raised for effective bonding to the second plastic. It is a still further object of the present invention to provide a process for lining a substantially cylindrical article made from a plastic, that softens as its temperature is increased, with another plastic, which also softens as its temperature increases, without affecting the dimensional stability of the article. It is a still further object of the present invention to provide a process for lining a substantially cylindrical article made from a difficult to bond plastic, such as tetrafluoroethylene, with another difficult to bond plastic, such as a copolymer of tetrafluoroethylene and hexafluoropropylene. Other objects will appear herein.

These objects are accomplished by the process which comprises the steps of: preforming the plastic lining material into a thin walled cylinder with one end closed, or adapted to be closed, and the other end adapted to receive fluid under pressure; heating the thin walled cylinder until it softens; radiantly heating the internal surface of the article to be lined by positioning within its internal cavity a radiant heater maintained at a temperature, dependent on the emissivity of the plastic from which the article is made, which is just sufficient to raise the internal surface of the article to the desired temperature without degrading that surface or affecting the overall dimensional stability of the article; removing the heater; positioning the thin walled cylinder within the article; closing off the end of the thin walled cylinder that is adapted to be closed, if necessary; inflating the thin walled cylinder by introducing a fluid under pressure into its interior, while both surfaces are still soft, until its external surface comes into contact with the internal surface of the article, and bonds to it; and then cooling the structure so formed.

The process of this invention, especially the use of radiant heating: allows better control of process variables; facilitates the bonding of a thicker lining than normally possible; and gives rise to the ability to line articles of various diameter without substantial changes in process machinery, specifically the heating elements, because the amount of radiant heating achieved is substantially independent of the distance between the heater and the object to be heated.

The lining of a cylinder of tetrafluoroethylene with a copolymer of tetrafluoroethylene and hexafluoropropylene illustrates one of the important applications of this invention. Both of these plastics are thermoplastics which are hard to bond to each other or to any other substance. In the production of Teflon® fluorocarbon heat exchanges, the ends of a bundle of tubes made from a copolymer of tetrafluoroethylene and hexafluoropropylene are bonded together and bonded to a rigid sleeve made substantially from tetrafluoroethylene; both bonds being leak tight. The bonding step is difficult enough without the additional problem of bonding different materials, so prior to the bonding of the tubes to the sleeve, the sleeve is lined with a liner of the particular copolymer from which the tubes are made. This liner itself must be bonded to the sleeve in a leak-tight arrangement which leads to the process of the present invention. The problem arises because the temperature to which tetrafluoroethylene should be raised for effective bonding to the copolymer of tetrafluoroethylene and hexafluoropropylene is equivalent to or higher than the temperature at which the copolymer begins to degrade. Aside from this, if the sleeve of tetrafluoroethylene is heated uniformly to its softening temperature, this reduces its dimensional stability so that any attempt to blow line it will cause it to distort in response to the pressure applied.

The problem is solved by radiantly heating the interior of the sleeve until it softens while simultaneously heating a bottle, made from the copolymer and designed to fit within the sleeve, then removing the heaters, inserting the bottle in the sleeve, and finally inflating the bottle, while both surfaces are still soft, until it contacts the sleeve and bonds to it. To reach this solution, however, one must realize that radiant heating of the internal surface to the desired temperature is possible without heating the whole structure. For tetrafluoroethylene, as with many other plastics, it has been the generally accepted notion that radiant heating of only one surface to the proper bonding temperature is not possible. The reason for this is that if the temperature of the heater is below a certain temperature the emissivity of the material, which is temperature dependent, is so low that the rate at which the surface reaches the desired temperature is not fast enough and the thermal conductivity of the material allows the whole structure to heat up uniformly, causing a loss of dimensional stability. Above that temperature, the emissivity increases rapidly to the point where before the internal surface uniformly reaches its softening point, portions of it degrade, producing a surface which will not bond properly to the copolymer. It was generally felt that there was no intermediate ground. In the process of the present invention it has been found that there is a critical range of temperature in which the heating rate of the internal surface due to radiant heating is fast enough so that only the surface has time to heat up, and slow enough so that catastrophic degradation of the surface does not occur.

In addition to the care which must be taken in the preparation of the internal surface of the sleeve for bonding, the fact that the materials used may have different high temperature properties presents another problem. If one of the materials has a softening temperature that is above the degradation temperature of the materials to which it is to be bonded, then bonding the two materials together without degrading the one with the low degradation temperature becomes difficult. The materials need not be at the same temperature for bonding, however, and separate heating of the two structures to the temperatures at which they are to be bonded at least allows the initial heating steps to proceed without degradation of the lower degradation temperature material, but when the two parts are brought together conductive heating by the high temperature material has a tendency to degrade the other material. Even if the higher temperature material begins to soften at a temperature below the degradation temperature of the other material, in practice, that material must be heated well above the point at which it just begins to soften for effective bonding to occur, so the actual bonding temperature is raised to a point which is above the degradation temperature of the second material. Such is the case with the bonding of tetrafluoroethylene to a copolymer of tetrafluoroethylene and hexafluoropropylene. Tetrafluoroethylene begins to soften at about 620° F. which is just below the temperature at which the copolymer begins to degrade. Actually degradation is a time-temperature phenomenon. While the copolymer of tetrafluoroethylene and hexafluoropropylene begins to degrade at about 650° F. appreciable degradation in reasonable time spans, i.e. a few minutes, doesn't begin until the material is heated to above 700° F. Usually, however, to maintain the tetrafluoroethylene above its softening point during bonding and to get a good bond, the tetrafluoroethylene must be heated above 700° F., closer to 800° F., and degradation is a possibility. For purposes of the following discussion, the term softening temperature will be defined as that softening temperature at which effective bonding can be produced.

Though degradation is a possibility under such circumstances, it has been found that when the degradation temperature of one material is reasonably close to the softening temperature of the other material, bonding can be effected without appreciable degradation of the low degradation point material. A temperature difference of less than 200° F. between the degradation temperature of one material and the softening temperature of the other seems to be tolerable, but the actual temperature difference that can be tolerated in each circumstance will depend on the actual properties of the materials and the time required to achieve a good bond under the particular temperature conditions.

The above discussion has been directed to the bonding of a liner of a copolymer of tetrafluoroethylene and hexafluoropropylene to a cylinder of tetrafluoroethylene, but it is obvious that the same process is applicable to the bonding of any two plastics that soften before they degrade and have degradation and softening temperatures which are reasonably close to one another.

The process of bonding two such plastics together can best be understood by reference to the figure, which is a cross-sectional schematic view of an apparatus designed to perform the bonding process.

DETAILED DESCRIPTION OF DRAWINGS

In the figure, a substantially cylindrical article 11 is supported vertically on plate 12 and restrained from lateral movement by a positioning ring 13. As illustrated, the article is a cylinder, but any substantially cylindrical article can be lined using the present process. The wall thickness and the diameter of the cylinder are not critical, but the wall must be thick enough so that heating of the internal surface of the cylinder will not result in instantaneous heating of the entire cylinder. The thickness of the particular cylinder is, therefore, dependent on the thermal conductivity of the material from which it is made and on whether or not some external support in the form of a heat resistant constraint surrounding the article can be tolerated. In general, however, to keep the article from drooping under the force of gravity, it must be thick enough so that the outer portion of the cylinder retains its dimensional stability when the interior softens. For this reason the cylinder 11 is referred to as a thick walled, substantially cylindrical article. The process has been demonstrated on cylinders made from tetrafluoroethylene with diameters ranging from 2.5" to 13" having wall thicknesses which are between 15 and 25% of their diameter.

The liner material has been preformed into the form of a thin walled cylinder 14, having an external diameter less than the internal diameter of article 11, with one end 15 closed, or adapted to be closed, and the other end 16 adapted to receive fluid under pressure. As illustrated the thin walled cylinder is a bottle with a threaded neck which threadedly engages support plate 17. Support plate 17 has a port 18 which is connected to the interior of bottle 14 so that a fluid under pressure can be introduced into the bottle. It is most convenient to have the thin walled cylinder already closed at one end, but it is possible to have the end open during the heating stage and then provide some means such as a plug or a clamp to close the end during the inflation of the cylinder to be described below. The cylinder 14 is described as being thin walled because, when heated, it is best if the entire structure or at least the sides of the structure heats uniformly to the softening point in a reasonable period of time, so that the structure will inflate easily and uniformly. Liners made from a copolymer of tetrafluoroethylene and hexafluoropropylene, having wall thicknesses of 0.02" to 0.06" and diameters which are 0.5" to 1.0" less than the internal diameter of article 11 have been successfully bonded to cylinders made from tetrafluoroethylene.

The materials used to form the bottle 14 and the cylinder 11 can be any plastics which soften before they degrade. Such plastics are usually described as thermoplastics, but there are certain plastics, such as the polyimides, which are described as thermoplastics to distinguish them from thermosetting plastics, which do not soften before they degrade, and which, therefore, would not be useful in the practice of the present invention. The two structures can be made from the same material, but more normally they would be made from different materials. Aside from both having the characteristic of softening before they degrade, the two plastics should degrade at temperatures which are not too dissimilar from one another, or at least the softening temperature of one should not be too much higher than the degradation temperature of the other. Otherwise, when the two are brought into contact the temperature of one will cause the other to degrade before a good bond is formed. A 200° F. difference appears to be tolerable but the actual difference which can be tolerated will depend on a number of factors such as, the actual degradation temperatures, the thermal conductivity of the plastics, the thickness of the plastics and the rate at which the bonded structure is cooled.

As illustrated, plate 12 supporting article 11 and the plate 19 supporting support plate 17 are part of a structure supported by rods 20. Plates 12 and 19 are separated from one another by a distance which allows bottle 14 to be inserted within the internal cavity of article 11. Normally, the bottle would completely fill the cavity so that the entire interior surface of article 11 would be coated, but it is conceivable that only a portion of article 11 would need to be coated, in which case the bottle can be only partially inserted.

In the first stage of the process, after the plastic liner material has been preformed into a bottle and attached to support plate 17, support plate 17 is raised by rod 21 until the bottle is within its heating region. As illustrated the bottle heater is comprised of two jaws 22, in the form of half cylinders, which are adapted to be moved inward to surround the bottle and outward to release the bottle by the movement of rods 23.

While the bottle is being heated, the internal surface of article 11 is also being heated. Doors 24 open, by pivoting around pivots 25, and heater 26 is raised by rod 27 into the interior cavity of cylinder 11. As illustrated, all movements are accomplished pneumatically by the use of pneumatic chambers indicated collectively by the number 28. This is for the purpose of automating of the process, but the movement can be accomplished in any convenient way.

Heater 26 is a radiant heater. While some convective heating is bound to occur, the majority of the heating takes place by radiant heating. The temperature of the heater is usually critical. It is dependent on the emissivity of the material from which article 11 is made, and is chosen to be in the range where the emissivity of the material is high enough to allow rapid heating of the internal surface of article 11 and low enough so that catastrophic heating and consequent degradation of the surface does not occur. The choice of this temperature range is largely empirical. When article 11 is made from tetrafluoroethylene, the range between 1400° and 1600° F. has been found to be optimum. Prior to the present invention it was generally believed that below 1600° F., the emissivity of tetrafluoroethylene was too low to allow surface heating in a reasonable length of time, i.e. within a time short by comparison to the time it takes for the whole structure to become soft, and that above 1600° F. heating occurred too rapidly, leading to spot degradation along with softening. It has been found that in the range between 1400° and 1600° F. the emissivity of tetrafluoroethylene while low, is high enough to allow rapid but not catastrophic surface heating.

The temperature of both the bottle 14 and the internal surface of article 11 prior to the removal of the heaters must be slightly above their actual softening temperatures, to allow for partial cooling in the interval between the time that the heating steps and the bonding begins. When the article is made from tetrafluoroethylene and the liner from a copolymer of tetrafluoroethylene and hexafluoropropylene then a temperature of between 650° and 800° F. for the internal surface of the article and between 520° and 600° F. for the bottle is sufficient if bonding begins within 5 to 15 seconds from the time when the heaters were removed.

The next step in the process is to remove the heaters. Then doors 24 are closed to keep the bottom of the bottle from blowing out, and bottle 14 is lowered into the internal cavity of article 11. A fluid under pressure is introduced through port 18 into the interior of the bottle causing it to expand until its external surface comes into contact with the internal surface of article 11. If both surfaces are still soft, bonding occurs. The fluid used is usually air, between 5 and 20 p.s.i.g. Once the bond has been made, the fluid pressure is decreased, the structure is cooled and, if desired, the ends are trimmed to remove the ends of the bottle.

The apparatus described above is just one possible embodiment of an apparatus which can be used in the practice of the present invention. The discussion is, therefore, merely intended to illustrate the following process.

What is claimed is:

1. A method for lining the interior of a thick walled tubular article made from a first plastic, with a layer of a second plastic when one of the plastics has a degradation temperature close to the softening temperature of the other plastic, which comprises:
   (a) heating a thin walled tubular element made from said second plastic to a temperature above its softening temperature and below its degradation temperature, said thin walled tubular element having an external diameter less than the internal diameter of said thick walled tubular article;
   (b) radiantly heating the internal surface of said thick walled tubular article to a temperature above its softening temperature and below its degradation temperature;
   (c) positioning said thin walled tubular element within said thick walled tubular article; and
   (d) bonding the external surface of the thin walled tubular element to the internal surface of the thick walled tubular element while the two surfaces are still soft by introducing a fluid under pressure into the interior of the thin walled tubular element until its external surface expands into intimate contact with the internal surface of said thick walled tubular article.

2. The method of claim 1 wherein said fluid is a gas.

3. The method of claim 2 wherein said thin walled tubular element is in the form of a bottle.

4. The method of claim 2 wherein said second plastic has a degradation temperature within 200° F. of the softening temperature of said first plastic.

5. The method of claim 2 wherein said first plastic has a degradation temperature within 200° F. of the softening temperature of said second plastic.

6. The method of claim 2 wherein said first plastic is tetrafluoroethylene.

7. The method of claim 2 wherein said second plastic is a copolymer of tetrafluoroethylene and hexafluoropropylene.

8. The method of claim 2 wherein said first plastic is tetrafluoroethylene and said second plastic is a copolymer of tetrafluoroethylene and hexafluoropropylene.

9. The process of claim 8 wherein said thin walled tubular element is heated to a temperature of 520–600° F.

and the internal surface of said thick walled tubular article is heated to a temperature of 650° to 800° F.

10. The process of claim 8 wherein the internal surface of said thick walled tubular article is exposed to a radiant heater having an emission temperature of 1400° to 1600° F. for a time just sufficient to raise the internal surface of said thick walled tubular article to a temperature of 650° to 800° F. and said thin walled tubular element is heated to a temperature of 520° to 600° F.

11. The process of claim 8 wherein the step of applying fluid under pressure into the interior of said thin walled tubular element comprises introducing air at a pressure between 5 and 50 p.s.i.g. into said bottle.

References Cited

UNITED STATES PATENTS

| 2,805,787 | 9/1957 | Sherman | 156—293 X |
| 3,301,736 | 1/1967 | Smith | 156—294 X |

FOREIGN PATENTS

| 312,211 | 2/1956 | Switzerland | 156—293 |

CARL QUAFORTH, Primary Examiner

E. E. LEHMAN, Assistant Examiner

U.S. Cl. X.R.

156—156, 272, 285, 303.1, 322